US008204529B2

(12) United States Patent (10) Patent No.: US 8,204,529 B2
Chu et al. (45) Date of Patent: Jun. 19, 2012

(54) DEVICE AND METHOD FOR FREQUENCY SCANNING USING TWO RADIOS

(75) Inventors: Yuechun Chu, Winter Springs, FL (US); Keith J. Goldberg, Casselberry, FL (US)

(73) Assignee: Motorola Solutions, Inc., Schaumburg, IL (US)

( * ) Notice: Subject to any disclaimer, the term of this patent is extended or adjusted under 35 U.S.C. 154(b) by 501 days.

(21) Appl. No.: 12/366,291

(22) Filed: Feb. 5, 2009

(65) Prior Publication Data

US 2010/0197243 A1 Aug. 5, 2010

(51) Int. Cl.
*H04B 7/00* (2006.01)
(52) U.S. Cl. ............... 455/515; 455/161.1; 455/434
(58) Field of Classification Search .......... 455/515, 455/161.1, 434
See application file for complete search history.

(56) References Cited

U.S. PATENT DOCUMENTS

| | | | |
|---|---|---|---|
| 4,887,265 A | 12/1989 | Felix | |
| 5,546,397 A * | 8/1996 | Mahany | 370/310 |
| 6,941,120 B2 * | 9/2005 | Barnett et al. | 455/164.2 |
| 7,260,393 B2 | 8/2007 | Fnu et al. | |
| 2004/0038647 A1 * | 2/2004 | Mahany | 455/73 |
| 2004/0103204 A1 | 5/2004 | Yegin | |
| 2005/0255847 A1 | 11/2005 | Han et al. | |
| 2006/0171304 A1 | 8/2006 | Hill et al. | |
| 2007/0225075 A1 * | 9/2007 | Loose | 463/42 |
| 2008/0107080 A1 | 5/2008 | Tsai | |
| 2009/0149143 A1 * | 6/2009 | Rokusek et al. | 455/150.1 |

FOREIGN PATENT DOCUMENTS

EP 1705835 A1 9/2006

OTHER PUBLICATIONS

Hush et al., "The Recursive Neural Network and its Application in Control Theory," Computers and Elect. Enr'g, vol. 19, No. 4, Jul. 1993, pp. 33-41.
Alicherry, et al. "Joint Channel Assignment and Routing for Throughput Optimization in Multi-Radio Wireless Mesh Networks", Proceedings of the 11th Annual International Conference on Mobile Computing and Networking (MOBICOM), 2005, pp. 58-72.
R. Draves, J. Padhye, and B. Zill, "Routing in Multi-radio, Multi-hop Wireless Mesh Networks," Proceedings of the 10th Annual International Conference on Mobile Computing and Networking (MobiCom), 2004, pp. 114-128.
P. Bahl, A. Adya, J. Padhye and A. Wolman, "Reconsidering Wireless Systems with Multiple Radios," ACM SIGCOMM Computer Communication Review, vol. 34, No. 5, Oct. 2004, pp. 39-46.
N. Venkitaraman, "Seamless Mobility using Multiple Interfaces," Technical Disclosure (IPCOM000009459D), Aug. 2002, http://www.ip.com/pubview/IPC000009459.
G. Saikails and F. Lin, "Adaptive Neural Network control by Adaptive Interaction," Proceedings of American Control Conference of 2001, vol. 2, 2001, pp. 1247-1252.
International Search Report and Written opinion mailed on Sep. 15, 2010 for International Application No. PCT/US2010/022695.
International Preliminary Report on Patentability mailed on Aug. 18, 2011 for International Application No. PCT/US2010/022695.

* cited by examiner

*Primary Examiner* — Jason M Crawford
(74) *Attorney, Agent, or Firm* — Randi L. Karpinia

(57) ABSTRACT

A device (100) and method for frequency scanning uses two radios. The device (100) includes a processor (515), a scan radio (130) including a receiver (135) coupled to the processor (515), and a data radio (105) including a transmitter (115) that is also coupled to the processor (515). The processor (515) determines a transmission schedule for the transmitter (115) of the data radio (105) in response to a capability to receive a frequency scanning signal at the receiver (135) of the scan radio (130).

20 Claims, 4 Drawing Sheets

DEVICE AND METHOD FOR FREQUENCY SCANNING USING TWO RADIOS

FIELD OF THE DISCLOSURE

The present invention relates generally to wireless communication networks, and in particular to dynamic frequency scanning using a dedicated scan radio.

BACKGROUND

Many wireless communication systems require a rapid deployment of independent mobile users as well as reliable communications between user nodes. Mesh networks are based on self-configuring autonomous collections of portable devices that communicate with each other over wireless links having limited bandwidths. A mesh network is a collection of wireless nodes or devices organized in a decentralized manner to provide range extension by allowing nodes to be reached across multiple hops. In a mesh network, communication packets sent by a source node thus can be relayed through one or more intermediary nodes before reaching a destination node. Mesh networks may be deployed as temporary packet radio networks that do not involve significant, if any, supporting infrastructure. Rather than employing fixed base stations, in some mesh networks each user node can operate as a router for other user nodes, thus enabling expanded network coverage that can be set up quickly, at low cost, and which is highly fault tolerant. In some mesh networks, special wireless routers also may be used as intermediary infrastructure nodes. Large networks thus can be realized using intelligent access points (IAPs), also known as gateways or portals, which provide wireless nodes with access to a wired backhaul or wide area network (WAN).

Mesh networks can provide critical communication services in various environments involving, for example, emergency services supporting police and fire personnel, military applications, industrial facilities and construction sites. Mesh networks are also used to provide communication services in homes, in areas with no basic telecommunications or little broadband infrastructure, and in areas with demand for high speed services (e.g., universities, corporate campuses, and dense urban areas).

A typical mesh network comprises three types of nodes: intelligent access points (IAPs), access points (APs), and stations (STAs). An IAP generally has access to a backhaul network and provides data service to one or more APs. Each AP then provides data service to various STAs, such as handheld radios or other standard Institute of Electrical and Electronics Engineers (IEEE) 802.11 devices. (Note: for any IEEE standards recited herein, see: http://standards.ieee.org/getieee802/index.html or contact the IEEE at IEEE, 445 Hoes Lane, PO Box 1331, Piscataway, N.J. 08855-1331, USA.) An AP generally can connect to an IAP directly or through a multi-hop route. To maintain a connection, an IAP and its associated APs/STAs generally operate over the same radio channel.

When an AP (for example, a mesh node in a command vehicle operating at an incident scene) moves, it may need to conduct a handoff process (i.e., disassociate from a current mesh network and associate with another mesh network). Because different mesh networks can operate on different channels, the AP generally first conducts a scan to identify the operating channel of another mesh network to which it can become associated. The moving AP often needs to quickly select a channel to complete the handoff process without losing connectivity.

A scan process generally requires an AP to switch to another channel and listen for beacon signals sent from available IAPs. Because multiple channels are often available to a network deployment, a considerable amount of time may be required to scan all possible channels and select a suitable candidate. One way to complete such a long scan process is to begin the scan process well before a handoff process. Then, when the handoff process starts, the AP can quickly select a channel based on the information collected from the previous scan.

However, to scan a non-operating channel to listen for beacon signals, an AP generally must temporarily stop communicating over the current communication channel, which may cause a serious service interruption of the communication channel. Accordingly, there is a need for an improved device and method for frequency scanning.

BRIEF DESCRIPTION OF THE FIGURES

The accompanying figures, where like reference numerals refer to identical or functionally similar elements throughout the separate views, together with the detailed description below, are incorporated in and form part of the specification, and serve to further illustrate embodiments of concepts that include the claimed invention, and explain various principles and advantages of those embodiments.

Figure 1:
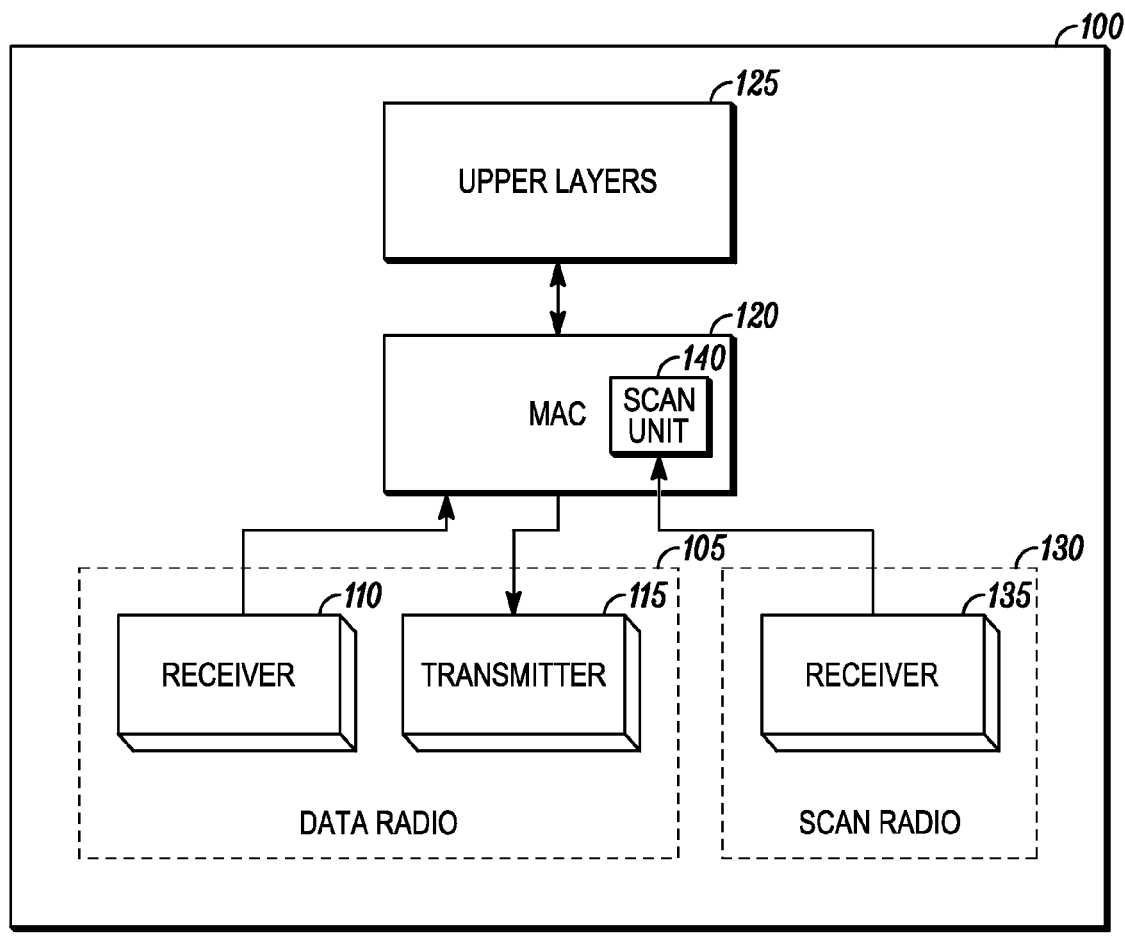
FIG. 1 is a block diagram illustrating functional components of a wireless communication device, according to some embodiments.

Skilled artisans will appreciate that elements in the figures are illustrated for simplicity and clarity and have not necessarily been drawn to scale. For example, the dimensions of some of the elements in the figures may be exaggerated relative to other elements to help to improve understanding of embodiments of the present invention.

The apparatus and method components have been represented where appropriate by conventional symbols in the drawings, showing only those specific details that are pertinent to understanding the embodiments of the present invention so as not to obscure the disclosure with details that will be readily apparent to those of ordinary skill in the art having the benefit of the description herein.

DETAILED DESCRIPTION

According to some embodiments of the present invention, a method enables frequency scanning at a wireless communication device using two radios. The method includes determining a transmission schedule for a transmitter of a data radio coupled to the wireless communication device, where the transmission schedule is in response to a capability to receive a frequency scanning signal at a receiver of a scan radio coupled to the wireless communication device. Next, transmissions are performed from the transmitter according to the transmission schedule. Then, between transmissions from the transmitter of the data radio, the frequency scanning signal is received at the receiver of the scan radio.

Embodiments of the present invention thus enable effective reduction of wireless communication device service interruptions that are caused by scanning. By using two radios in the wireless communication device, a data radio and a dedicated scan radio, the data radio does not need to perform frequency scans and is thus not susceptible to scanning-induced service interruptions.

Referring to FIG. 1, a block diagram illustrates functional components of a wireless communication device 100, according to some embodiments of the present invention. A data radio 105 includes a receiver 110 and a transmitter 115, which both communicate with a lower layer medium access control (MAC) module 120. The lower layer MAC module 120 also communicates with an upper layer MAC module 125. A dedicated scan radio 130 includes a receiver 135, which communicates with a scan unit 140 in the lower layer MAC module 120.

The data radio 105 can function as a conventional transceiver; whereas the scan radio 130 may include only the receiver 135 and not include a transmitter. The scan unit 140 can be a simple functional unit that processes beacon messages received by the scan radio 130. Thus the scan unit 140 may not be required to practice carrier sense multiple access with collision avoidance (CSMA/CA) or other well-known MAC protocols. The general low cost of radio hardware today can make adding the dedicated scan radio 130 to the wireless communication device 100 very economical.

It is known that when two IEEE 802.11 radios having regular omni-directional antennas are located in a single wireless device and operate in different channels of a same frequency band, the radios may interfere with each other. For example, if a first radio operates in channel 1 and a second radio operates in channel 6 of the 2.4 GHz band, the first and second radios may interfere with each other, as unwanted coupling can occur between the two channels. Such self-interference can degrade the performance of both radios.

Therefore, according to the present invention, transmissions from the data radio 105 are scheduled so as to not interfere with reception at the scan radio 130. Because the scan radio 130 does not transmit, it cannot interfere with the data radio 105. However, when the data radio 105 is transmitting, the scan radio 130 may not be able to receive any communications due to the self-interference from the data radio 105.

Many modern wireless communication devices operate in a half-duplex manner using conventional "back-off" processes, which means that the transmitter and receiver of a device do not operate at the same time. However, it may be difficult for the transmitter 115 of the data radio 105 and the receiver 135 of the scan radio 130 to operate in a similar half-duplex manner using conventional back-off processes. That is because beacon signals received by the scan radio 130 may not be strong enough to trigger the data radio 105 to back off, as received signals will generally be relatively weak compared to transmission signals from the transmitter 115. Also, the receiver 110 of the data radio 105 operates in a different channel than the receiver 135 of the scan radio 130. Thus, when the receiver 135 of the scan radio 130 is receiving, the receiver 110 of the data radio 105 may capture only very weak signals, which are not strong enough to trigger a back-off process of the data radio 105.

According to some embodiments of the present invention, the scan radio 130 is dedicated to passive scanning (i.e. listening for beacon signals) over a range of channels. Because such beacon signals comprise information packets that are transmitted periodically and repeatedly, the scan radio 130 is not required to collect all beacon signals. For example, in general, the scan radio 130 may still operate effectively when it receives only 20% of such beacon signals. Furthermore, as described in detail below, if the data radio 105 and the scan radio 130 operate completely independently (i.e., completely unaware of each other), in most circumstances (even in saturated networks), the scan radio 130 can capture at least 20% of beacon signals.

Therefore, a basic scan process of the wireless communication device 100 can proceed as follows. First, the data radio 105 can conduct conventional data communications, such as the conventional data communications of a standard IEEE 802.11 radio device. Meanwhile, the scan radio 130 can scan all candidate channels one by one. For example, the receiver 135 tunes to a channel and listens for a defined "measurement duration." Then the receiver 135 tunes to another channel and again listens for a defined measurement duration. All received beacons are then processed in the scan unit 140.

Based on information in the received beacons, the scan unit 140 maintains a list of potential intelligent access points (IAPs), their received signal strength indications (RSSIs), and their operating channels. Such information is provided to the MAC protocol managing the data radio 105. Then, when an IAP switching is required, the data radio 105 can quickly switch to another IAP operating in a current or different channel without significant service interruption of the data radio 105.

Because the scan radio 130 is expected to miss some beacons from other radios due to the self-interference described above, the scan radio 130 may need to listen on a particular channel for a longer period in order to capture an adequate number of beacon signals. For example, the value of a "measurement duration" may by default be set to 3-5 times longer than a standard beacon signal interval. However, because the scan radio 130 is dedicated only to scanning, such a longer scan time does not interfere with operation of the data radio 105.

Although in most cases the scan radio 130 can capture at least 20% of beacon signals, in some worst case circumstances the scan radio 130 may capture only about 5.0% of beacon signals. For example, consider that the data radio 105 has a transmission capacity of 54 megabits per second (Mbps). If the data radio 105 then carries data traffic of more than 21 Mbps, and if the scan radio 130 is operated simultaneously, simulations suggest that the scan radio 130 may capture only about 5.0% of beacon signals. Such circumstances assume that other network nodes are not competing for access to the channel, and thus the data radio 105 executes no back-off procedures. Therefore the percentage of successful transmissions from the data radio 105 is high, and the interval between consecutive transmissions is very short. When the data radio 105 transmits near full capacity, the data radio 105 can spend a lot of time transmitting, which prevents the scan radio 130 from receiving beacon signals.

Therefore, a scan support policy can be added to the MAC layer module 120 to increase the probability of the scan radio 130 capturing an adequate number of beacon signals. Because in most circumstances the scan radio 130 can collect adequate beacons signals, a basic scan process can be used by default, and the scan support policy implemented only as a back-up policy. Thus, according to some embodiments of the present invention, a principle behind the scan support policy may be to not disturb the data radio 105 unless the scan radio 130 has very little chance of receiving an adequate number of beacon signals.

As described above, if the data radio 105 engages in too much transmission activity, the scan radio 130 may not receive an adequate number of beacon signals. According to some embodiments of the present invention, a transmission rate from the data radio 105 can be slowed down to ensure that the scan radio 130 receives an adequate amount of beacon signals. Such adjustments to the transmission rate from the data radio 105 may depend on a beacon capturing probability defined as a beacon receiving ratio (i.e., a number of received beacons/a number of generated beacons).

Because the utilization of the transmitter 115 of the data radio 105 is directly related to the beacon receiving ratio, an empirical graph of a beacon receiving ratio versus a transmission rate can be generated. A transmission rate of the data radio 105 then can be adjusted according to the graph. Such a transmission rate can be defined as a percentage of the time the transmitter 115 spends transmitting versus a total operation time of the data radio 105.

Figure 2:
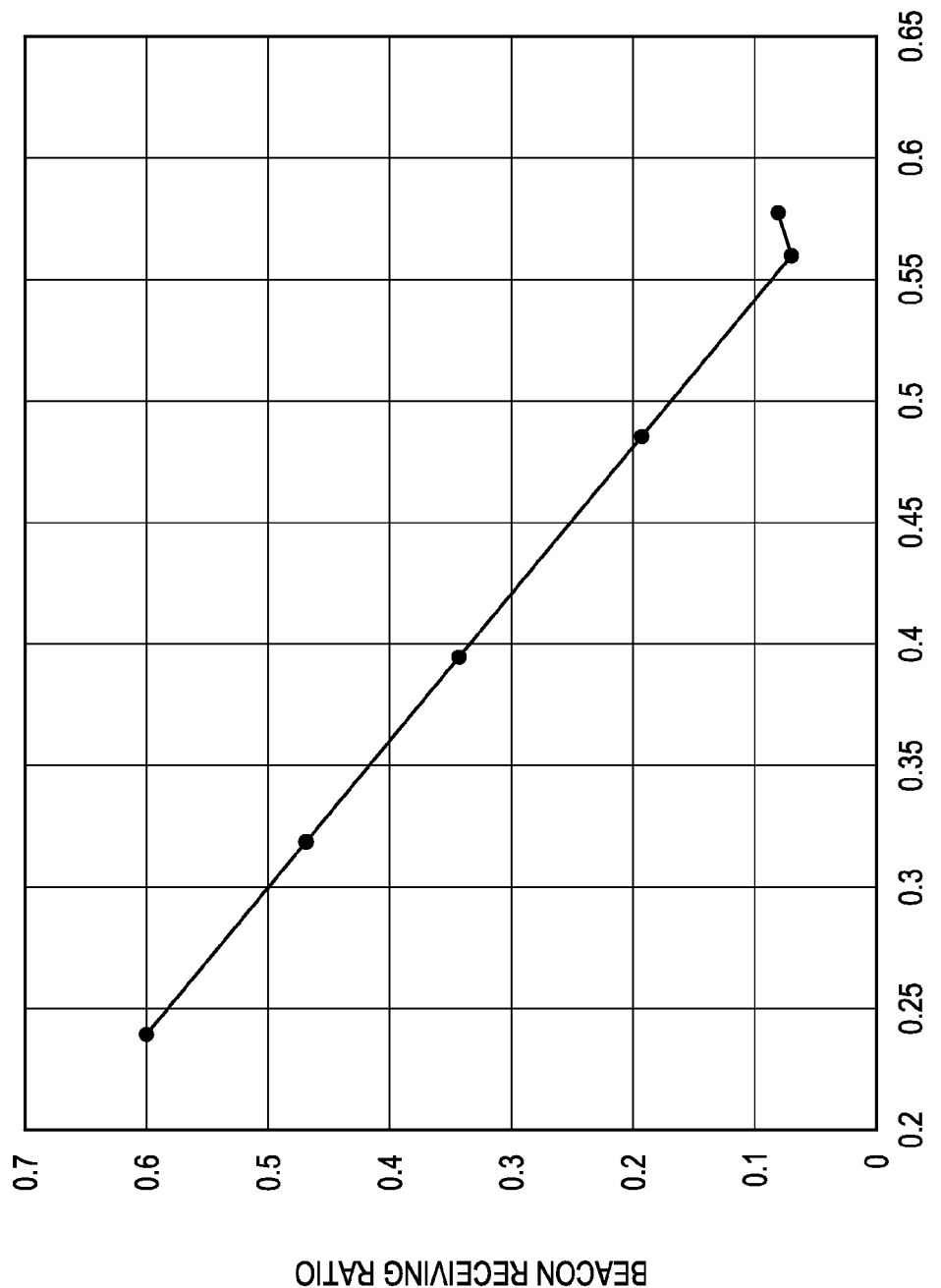
FIG. 2 is a graph illustrating an example of a beacon receiving ratio versus a transmission rate of a wireless communication device, according to some embodiments.

Referring to FIG. 2, a graph illustrates an example of a beacon receiving ratio versus a transmission rate of the wireless communication device 100, according to some embodiments of the present invention. As will be understood by those having ordinary skill in the art, such a graph can be generated based on simulated data or experimental measurements. As shown, when the transmission rate of the data radio 105 exceeds about 48%, the beacon receiving ratio drops below 20%. Considering that 20% may be set as a predetermined threshold defining a minimum acceptable beacon receiving ratio, a policy then can be defined in the wireless communication device 100 to limit the transmission rate of the data radio 105 to no greater than 48%.

If the transmission rate of the data radio 105 approaches 48%, the lower layer MAC module 120 begins to schedule transmission of "virtual packets". The transmission time of a virtual packet is generally a moving average of a transmission time for ordinary data packets. The amount of scheduled virtual packets is then adjusted based on the utilization of the transmitter 115.

For example, consider that a threshold utilization rate $u_{th}$ of the transmitter 115 is defined as the maximum transmission rate of 48% as described above. Given a current utilization rate $u_c$ of the transmitter 115, the percentage of virtual packets required is defined as $(u_c - u_{th})/u_{th}$. When a virtual packet is scheduled for transmission, the transmitter 115 does not transmit anything, but simply idles for the duration of the transmission time. Therefore no self-interference is created for the scan radio 130 during the transmission duration.

In addition to the utilization of the transmitter 115 of the data radio 105, the beacon receiving ratio also may be related to other factors such as traffic generation, packet size, and network condition. Thus in some circumstances it may be useful to apply a more adaptive determination of an acceptable transmission rate of the data radio 105.

As described above, due to self-interference, the scan radio 130 generally cannot receive any beacon signals while the data radio 105 is transmitting (i.e., the scan radio 130 can capture beacon signals only when the transmitter 115 of the data radio 105 is idle). Further, consider that 1) packet transmission from the data radio 105 is a memory-less process (i.e., no correlation exists between transmitted packets) and 2) beacon signals received at the scan radio 130 are uniformly distributed. Then, the probability of the scan radio 130 receiving a frequency scanning signal in the form of a beacon signal can be estimated by the following equation:

$$P_s = \frac{\sum_{all\ i} t_{idle\_i} - t_s}{t_{total}}, \qquad \text{Eq. 1}$$

where $P_s$ is the probability, $t_{idle\_i}$ is a duration of a silence period, $t_s$ is a beacon transmission time, and $t_{total}$ is a total sample time.

Figure 3:
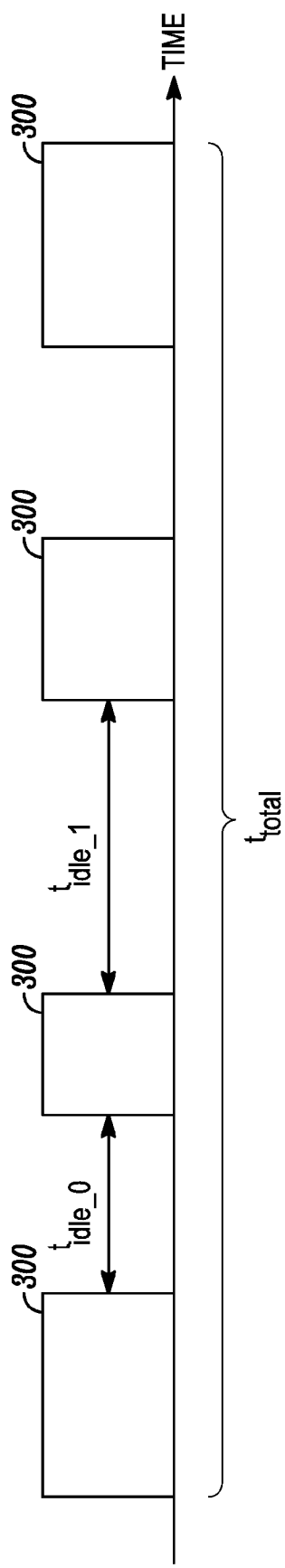
FIG. 3 is a diagram illustrating the variables $t_{idle\_i}$ and $t_{total}$ as defined relative to transmission periods, according to some embodiments.

Referring to FIG. 3, a diagram illustrates the variables $t_{idle\_i}$ and $t_{total}$ as defined relative to transmission periods 300, according to some embodiments of the present invention.

When the probability of capturing a beacon signal is less than a particular threshold, the lower layer MAC module 120 can start to schedule silence periods, where for example the duration of a single silence period is defined as the duration of a beacon signal transmission time. After transmitting a data packet, the transmitter 115 of the data radio 105 is required to remain idle for the duration of a silence period. However, it may be difficult to define the probability of a need to insert a silence period after a data packet is transmitted, because such a probability may have a nonlinear relationship with a probability of capturing a beacon signal. That is, inserting a silence period may not be linearly related to a transmission time of a next data packet. Therefore, according to some embodiments of the present invention, the lower layer MAC module 120 can first insert a silence period after transmitting a data packet when there is only a small probability of capturing a beacon signal, and then gradually increase the probability of capturing a beacon signal until the probability of capturing such a signal is over a predetermined threshold.

Figure 4:
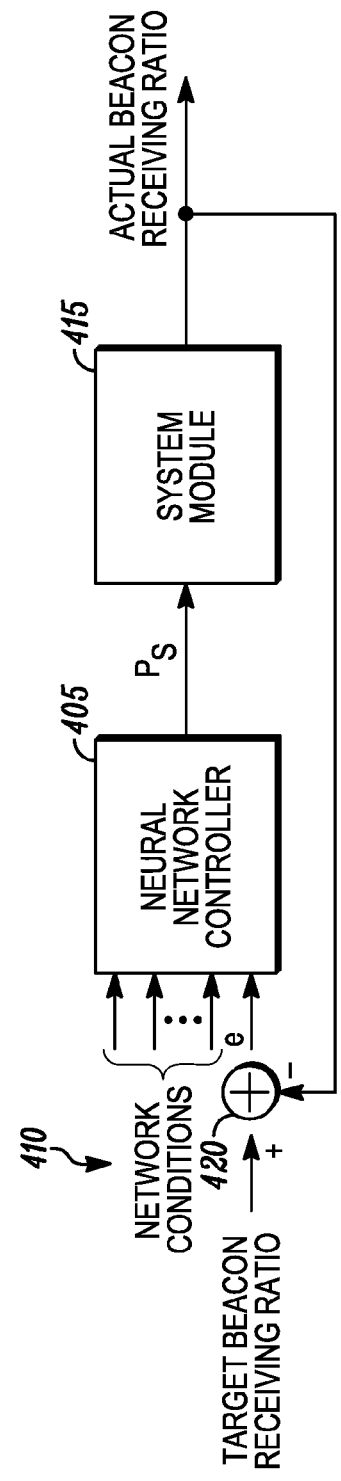
FIG. 4 is a diagram illustrating a neural network process for determining a probability of a scan radio receiving a frequency scanning signal, such as a beacon signal, according to some embodiments.

Referring to FIG. 4, a diagram illustrates a neural network process for determining a probability of the scan radio 130 receiving a frequency scanning signal, such as a beacon signal, according to some embodiments of the present invention. Equation 1 above is based on an assumption that data packet transmissions are not correlated with each other. However, in the real world, data packet transmissions in fact may be correlated with each other. Therefore, non-linear modeling may be used to establish a more efficient method of determining an appropriate transmission rate from the data radio 105.

A neural network controller 405 can employ conventional nonlinear modeling, as known by those having ordinary skill in the art. For example, such nonlinear modeling is described in D. Hush, C. Abdallah, and Bi. Horne, "The Recusive Neural Network and its Application in Control Theory," Computers and Electrical Engineering, Vol. 19, No. 4, July 1993, pp. 33-341; and in G. Saikails and F. Lin, "Adaptive Neural Network Control by Adaptive Interaction," Proceedings of American Control Conference of 2001, Vol. 2, 2001, pp. 1247-1252.

Network conditions 410 are input to the neural network controller 405, and may include parameters such as a transmission time of previous packets and an average beacon signal transmission time. An output of the neural network controller 405 is then a probability $P_s$ of inserting a silence period after transmitting a packet. The probability $P_s$ is then input to a dynamic transmission system module 415 that generates an actual beacon receiving ratio. A comparator 420 then compares the actual beacon receiving ratio with a target beacon receiving ratio, and the difference is provided as a feedback input to the neural network controller 405.

Wireless communication devices, such as the wireless communication device 100, that implement embodiments of the present invention can utilize various types of wireless network architectures including a mesh enabled architecture (MEA) network, or an Institute of Electrical and Electronics Engineers (IEEE) 802.11 network (i.e. 802.11a, 802.11b, 802.11g, 802.11n). It will be appreciated by those of ordinary skill in the art that such wireless communication networks can alternatively comprise any packetized communication network where packets are forwarded across multiple wireless hops. For example, such a wireless communication network can be a network utilizing multiple access schemes such as OFDMA (orthogonal frequency division multiple access), TDMA (time division multiple access), FDMA (Frequency Division Multiple Access), or CSMA (Carrier Sense Multiple Access).

Figure 5:
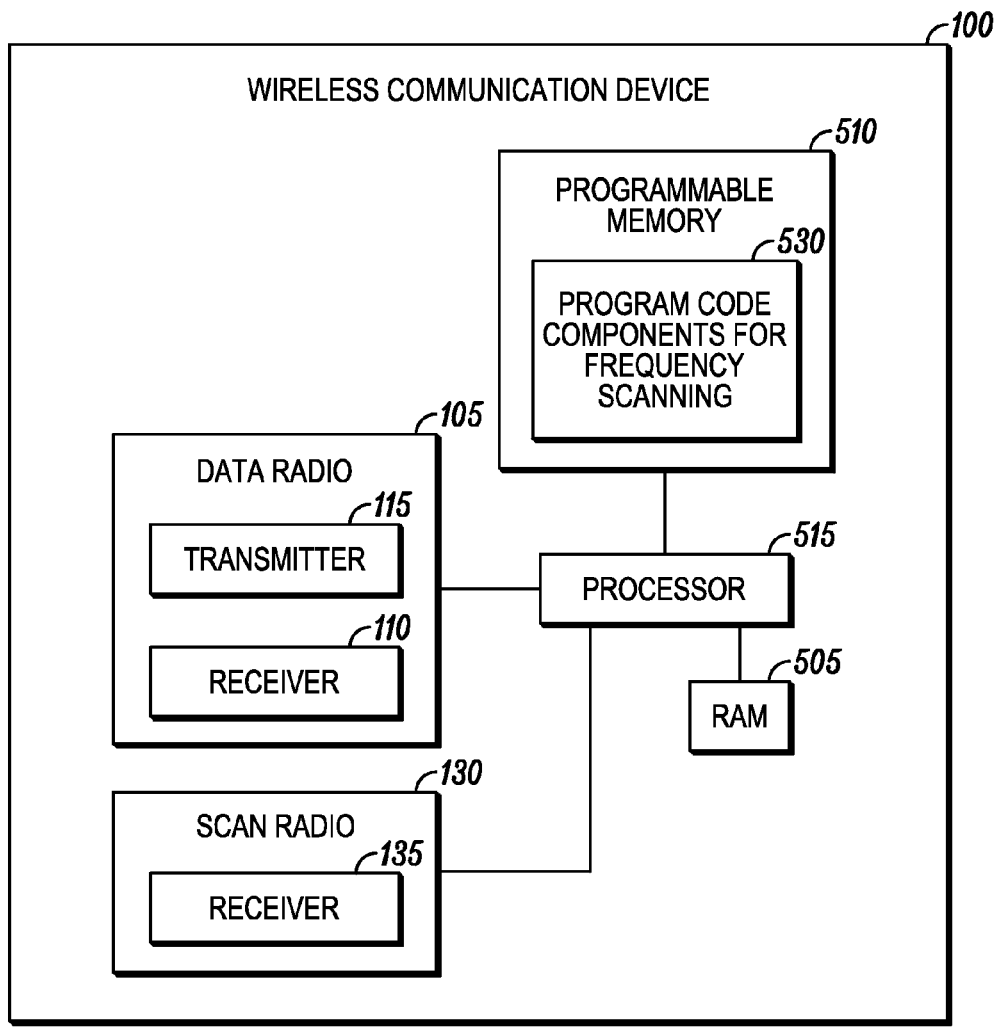
FIG. 5 is a block diagram further illustrating components of a wireless communication device that employs frequency scanning techniques according to some embodiments.

Referring to FIG. 5, a block diagram further illustrates components of the wireless communication device 100 that employs frequency scanning techniques according to some embodiments of the present invention. The wireless communication device 100, for example, can be an integrated unit such as a computer, mobile telephone, handheld radio or personal digital assistant (PDA) containing at least all the elements depicted in FIG. 1, as well as any other elements necessary for the device 100 to perform its particular functions. Alternatively, the device 100 can comprise a collection of appropriately interconnected units or devices, wherein such units or devices perform functions that are equivalent to the functions performed by the elements depicted in FIG. 5.

The wireless communication device 100 comprises a random access memory (RAM) 505 and a programmable memory 510 that are coupled to a processor 515. The processor 515 also has ports for coupling to the data radio 105 and to the scan radio 130. As described above, the data radio 105 and the scan radio 130 can be used to enable the device 100 to communicate with other node devices in a wireless communication network.

The programmable memory 510 can store operating code (OC) for the processor 515 and code for performing functions associated with a network device. For example, the programmable memory 510 can store computer readable program code components 530 configured to cause execution of a method for frequency scanning as described herein. Also, the programmable memory 510 can store computer readable program code components that define the lower layer MAC module 120, the upper layer MAC module 125, the neural network controller 405, and the system module 415.

Figure 6:
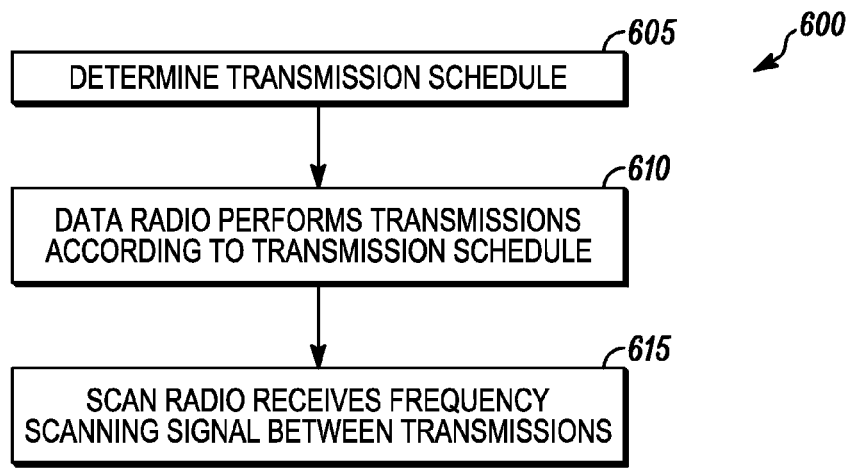
FIG. 6 is a general flow diagram illustrating a method for frequency scanning at a wireless communication device, according to some embodiments.

Referring to FIG. 6, a general flow diagram illustrates a method 600 for frequency scanning at a wireless communication device, such as the wireless communication device 100, according to some embodiments of the present invention. First, at step 605, a transmission schedule is determined for a transmitter of a data radio coupled to the wireless communication device, wherein the transmission schedule is in response to a capability to receive a frequency scanning signal at a receiver of a scan radio coupled to the wireless communication device. For example, the transmission schedule may be determined based on a probability of receiving a frequency scanning signal as defined in Equation 1 above.

At step 610, transmissions from the transmitter are performed according to the transmission schedule. For example, the transmitter 115 of the data radio 105 may transmit virtual packets, or remain idle during silence periods, as defined by a transmission schedule and directed by the lower layer MAC module 120.

Finally, at step 615, between transmissions from the transmitter of the data radio, the frequency scanning signal is received at the receiver of the scan radio. For example, the receiver 135 of the scan radio 130 receives frequency scanning signals in the form of beacon signals from alternative intelligent access points (IAPs) in a wireless communication network.

Advantages of some embodiments of the present invention therefore include effective reduction of wireless communication device service interruptions that are caused by scanning for alternative networks devices. By using two radios in a wireless communication device—a data radio and a dedicated scan radio—the data radio does not need to perform frequency scans and is thus not susceptible to scanning-induced service interruptions. The scan radio then can effectively receive frequency scanning signals such as beacon signals when the data radio is not transmitting.

In the foregoing specification, specific embodiments have been described. However, one of ordinary skill in the art appreciates that various modifications and changes can be made without departing from the scope of the invention as set forth in the claims below. Accordingly, the specification and figures are to be regarded in an illustrative rather than a restrictive sense, and all such modifications are intended to be included within the scope of the present teachings. The benefits, advantages, solutions to problems, and any element(s) that may cause any benefit, advantage, or solution to occur or become more pronounced are not to be construed as critical, required, or essential features or elements of any or all the claims. The invention is defined solely by the appended claims including any amendments made during the pendency of this application and all equivalents of those claims as issued.

Moreover in this document, relational terms such as first and second, top and bottom, and the like may be used solely to distinguish one entity or action from another entity or action without necessarily requiring or implying any actual such relationship or order between such entities or actions. The terms "comprises," "comprising," "has", "having," "includes", "including," "contains", "containing" or any other variation thereof, are intended to cover a non-exclusive inclusion, such that a process, method, article, or apparatus that comprises, has, includes, or contains a list of elements does not include only those elements but may include other elements not expressly listed or inherent to such process, method, article, or apparatus. An element preceded by "comprises a . . . ", "has a . . . ", "includes a . . . ", or "contains a . . . " does not, without more constraints, preclude the existence of additional identical elements in the process, method, article, or apparatus that comprises, has, includes, or contains the element. The terms "a" and "an" are defined as one or more unless explicitly stated otherwise herein. The terms "substantially", "essentially", "approximately", "about" or any other version thereof, are defined as being close to as understood by one of ordinary skill in the art, and in one non-limiting embodiment the term is defined to be within 10%, in another embodiment within 5%, in another embodiment within 1% and in another embodiment within 0.5%. The term "coupled" as used herein is defined as connected, although not necessarily directly and not necessarily mechanically. A device or structure that is "configured" in a certain way is configured in at least that way, but may also be configured in ways that are not listed.

It will be appreciated that some embodiments may be comprised of one or more generic or specialized processors (or "processing devices") such as microprocessors, digital signal processors, customized processors and field programmable gate arrays (FPGAs) and unique stored program instructions (including both software and firmware) that control the one or more processors to implement, in conjunction with certain non-processor circuits, some, most, or all of the functions of the method and system described herein. Alternatively, some or all functions could be implemented by a state machine that has no stored program instructions, or in one or more application specific integrated circuits (ASICs), in which each function or some combinations of certain of the functions are implemented as custom logic. Of course, a combination of the two approaches could be used.

Moreover, an embodiment can be implemented as a computer-readable storage medium having computer readable code stored thereon for programming a computer (e.g., comprising a processor) to perform a method as described and claimed herein. Examples of such computer-readable storage mediums include, but are not limited to, a hard disk, a CD-ROM, an optical storage device, a magnetic storage device, a ROM (Read Only Memory), a PROM (Programmable Read Only Memory), an EPROM (Erasable Programmable Read Only Memory), an EEPROM (Electrically Erasable Programmable Read Only Memory) and a Flash memory. Further, it is expected that one of ordinary skill, notwithstanding possibly significant effort and many design choices motivated by, for example, available time, current technology, and economic considerations, when guided by the concepts and principles disclosed herein will be readily capable of generating such software instructions and programs and ICs with minimal experimentation.

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various embodiments for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separately claimed subject matter.

We claim:

1. A wireless communication device, comprising:
a processor;
a scan radio including a receiver coupled to the processor; and
a data radio including a transmitter coupled to the processor;
wherein the receiver of the scan radio performs frequency scanning to receive frequency scanning signals for the data radio, and further wherein the processor determines a transmission schedule for the transmitter of the data radio based upon maintaining a ratio of a number of received frequency scanning signals to a number of generated frequency scanning signals above a predetermined threshold.

2. The device of claim 1, wherein the transmission schedule defines a transmission time for a virtual packet.

3. The device of claim 2, wherein a percentage of virtual packets required to be scheduled for transmission is defined as a ratio of a difference between a current utilization rate of the transmitter and a threshold utilization rate of the transmitter to the threshold utilization rate of the transmitter.

4. The device of claim 1, wherein maintaining the ratio of the number of received frequency scanning signals to the number of generated frequency scanning signals is determined by a transmission rate of the transmitter.

5. The device of claim 1, wherein maintaining the ratio of the number of received frequency scanning signals to the number of generated frequency scanning signals is determined by a probability of the scan radio receiving the frequency scanning signals.

6. The device of claim 5 wherein the probability of the scan radio receiving the frequency scanning signals is determined by the following equation:

$$P_s = \frac{\sum_{all\ i} t_{idle\_i} - t_s}{t_{total}},$$

where $P_s$ is the probability, $t_{idle\_i}$ is a duration of a silence period, $t_s$ is a beacon transmission time, and $t_{total}$ is a total sample time.

7. The device of claim 1, wherein the transmission schedule is determined by nonlinear modeling of an estimated beacon receiving ratio of the scan radio.

8. The device of claim 7, wherein a neural network controller operated by the processor performs the nonlinear modeling.

9. The device of claim 1, wherein transmissions from the data radio are performed according to the transmission schedule to maintain an actual beacon receiving ratio above the predetermined threshold, where the actual beacon receiving ratio is defined as a ratio of a number of received beacons to a number of generated beacons.

10. The device of claim 1, wherein the wireless communication device is an access point in a wireless mesh network.

11. A method for frequency scanning at a wireless communication device, the method comprising:
determining a transmission schedule for a transmitter of a data radio coupled to the wireless communication device, wherein the transmission schedule is based upon maintaining a ratio of a number of received frequency scanning signals to a number of generated frequency scanning signals at a receiver of a scan radio coupled to the wireless communication device above a predetermined threshold;
performing transmissions from the transmitter of the data radio according to the transmission schedule; and
receiving, between transmissions from the transmitter of the data radio, the frequency scanning signals at the receiver of the scan radio.

12. The method of claim 11, wherein determining the transmission schedule comprises scheduling when to transmit a virtual packet.

13. The method of claim 12, wherein a percentage of virtual packets required to be scheduled for transmission is defined as a ratio of a difference between a current utilization rate of the transmitter and a threshold utilization rate of the transmitter to the threshold utilization rate of the transmitter.

14. The method of claim 11, wherein maintaining the ratio of the number of received frequency scanning signals to the number of generated frequency scanning signals is determined by a transmission rate of the transmitter.

15. The method of claim 11, wherein maintaining the ratio of the number of received frequency scanning signals to the number of generated frequency scanning signals is determined by a probability of the scan radio receiving the frequency scanning signals.

16. The method of claim 15, wherein the probability of the scan radio receiving the frequency scanning signals is determined by the following equation:

$$P_s = \frac{\sum_{all\ i} t_{idle\_i} - t_s}{t_{total}},$$

where $P_s$ is the probability, $t_{idle\_i}$ is a duration of a silence period, $t_s$ is a beacon transmission time, and $t_{total}$ is a total sample time.

17. The method of claim 11, wherein determining the transmission schedule comprises nonlinear modeling of an estimated beacon receiving ratio of the scan radio.

18. The method of claim 17, wherein the nonlinear modeling employs a neural network controller.

19. The method of claim 11, wherein performing transmissions from the transmitter of the data radio maintains an actual beacon receiving ratio above the predetermined threshold, where the actual beacon receiving ratio is defined as a ratio of a number of received beacons to a number of generated beacons.

20. The method of claim 11, wherein the wireless communication device is an access point in a wireless mesh network.

* * * * *